United States Patent
Betzler et al.

(10) Patent No.: US 8,082,548 B2
(45) Date of Patent: Dec. 20, 2011

(54) SYSTEM AND METHOD FOR PERFORMING SYSTEMS MANAGEMENT ON IT-RESOURCES USING WEB SERVICES

(75) Inventors: Boas Betzler, Magstadt (DE); Dietmar Kuebler, Aldorf (DE); Georg Ochs, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 11/836,925

(22) Filed: Aug. 10, 2007

(65) Prior Publication Data
US 2008/0189713 A1  Aug. 7, 2008

(51) Int. Cl.
*G06F 9/46* (2006.01)
*G06F 15/173* (2006.01)
*G06F 9/44* (2006.01)

(52) U.S. Cl. .................... 718/104; 709/226; 719/320

(58) Field of Classification Search .................. None
See application file for complete search history.

(56) References Cited

U.S. PATENT DOCUMENTS

| | | | |
|---|---|---|---|
| 2005/0114359 A1* | 5/2005 | Li et al. | 707/100 |
| 2005/0182843 A1* | 8/2005 | Reistad et al. | 709/230 |
| 2006/0026552 A1* | 2/2006 | Mazzitelli et al. | 717/101 |

\* cited by examiner

*Primary Examiner* — Jennifer To
*Assistant Examiner* — Bing Zhao
(74) *Attorney, Agent, or Firm* — Roy W. Truelson (57) ABSTRACT

The present invention relates to the field of systems management on IT-resources using web services. An improved method proposes a single web service implementation which dynamically and automatically generates multiple WSDLs for respective multiple resource type classes. This implementation is model-agnostic, as it doesn't require any knowledge about the underlying model, be that a resource model, or any other model in question, and uses introspection of the applied model at the time of invocation for the dynamic WSDL generation. The state of the resource is maintained within the instrumentation of the resource. No additional persistence on top needs to be implemented. A single implementation of a low number of generic web services, basically only two, reduces implementation and maintenance efforts significantly.

13 Claims, 10 Drawing Sheets

Inventional

FIG. 4
Inventional

SYSTEM AND METHOD FOR PERFORMING SYSTEMS MANAGEMENT ON IT-RESOURCES USING WEB SERVICES

FIELD OF THE INVENTION

The present invention relates to the field of systems management. In particular, it relates to a method and system for performing systems management on IT-resources using web services, wherein the resources are managed in a computational network within a plurality of runtime environments having different respective instrumentations, and the web services are implemented according to a public web service standard, and a resource configuration database is provided for storing a collection of resource-specific data on such IT-resources.

DESCRIPTION OF RELATED ART

Web services (WS) standards such as WSDM (Web Services Distributed Management) and web service management and future converged standards describe how IT resources (operating systems, printers, applications, etc.) expose their manageability capabilities using web services to client applications. These client applications typically are systems management applications provided by IBM, by Internet Service Providers, or other vendors. Prior art web services describe their interfaces in XML documents following the WSDL (Web Service Definition Language) standard. They are accompanied by implementations of the respective web services typically being deployed and executed on application servers.

Figure 1:
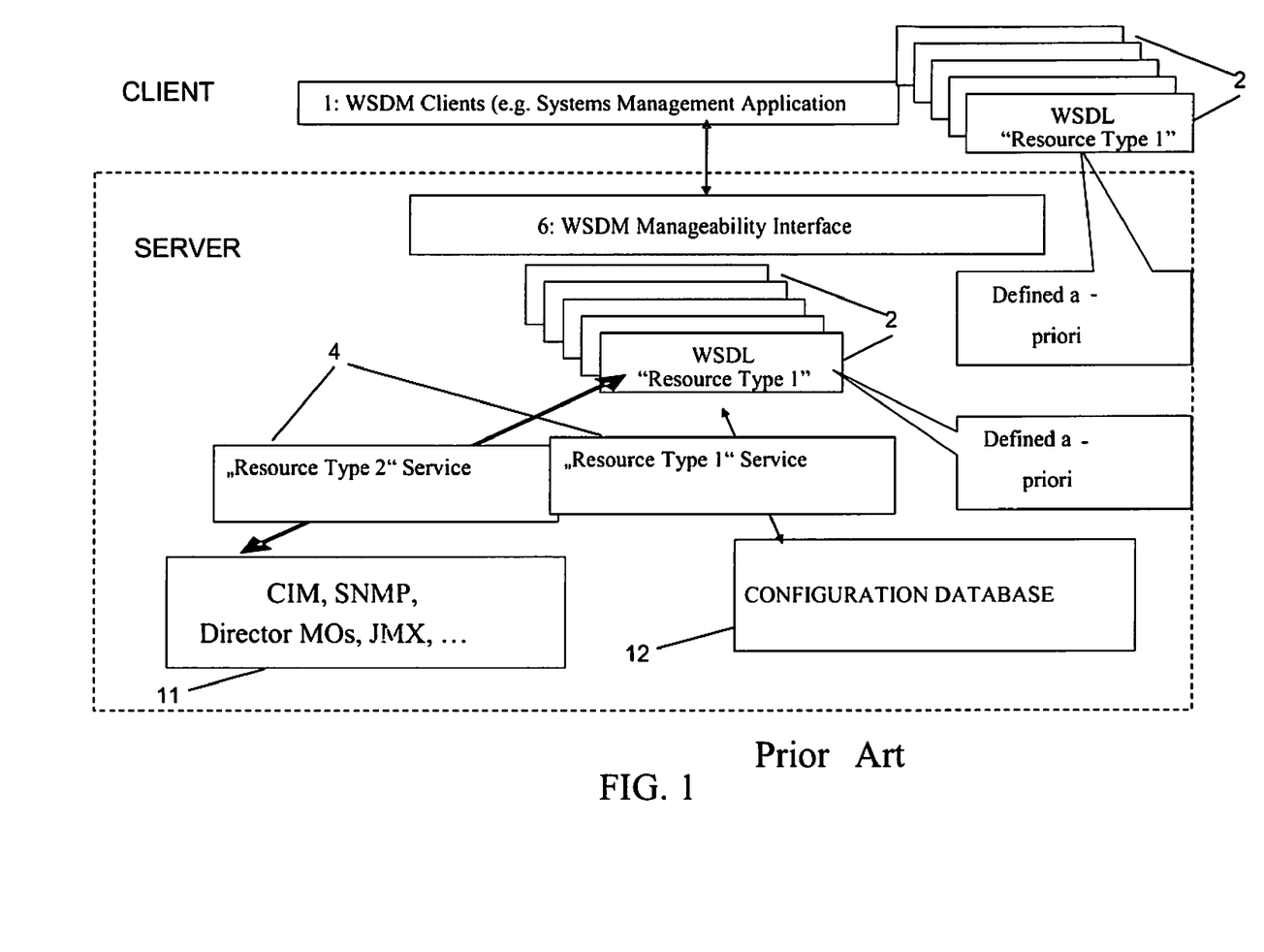
FIG. 1 illustrates functional elements in the system architecture used during prior art systems management via web services.

With reference to FIG. 1 representing a prior art system overview when applying prior art systems management by web services, prior art system management applications 1 target for a deployment of well-defined, strongly typed web services in order to be enabled to support all classes and types of resources and their relationships. Prior art clients/server systems management implementations require a set of WSDL definitions 2, 2' to be available to use a service and access the resource using web services.

As shown in FIG. 1, a client application implementing system management functions has to maintain a plurality 2 of WSDL documents, one for each resource type provided by the service implementations. On the server side inside the broken line box, the web service implementation needs to have the exact same WSDL documents 2' as well as the service implementations 4 based on these specific WSDL documents 2'.

SUMMARY OF THE INVENTION

The objective of at least one embodiment of the present invention is to provide an improved method and system for web service based systems management tasks. This objective is achieved by the features stated in enclosed independent claims. Further advantageous arrangements and embodiments of the invention are set forth in the respective dependent claims.

The present invention proposes a method for performing systems management on IT-resources using web services. In particular, a single web service implementation is proposed which dynamically and automatically generates multiple WSDLs for respective multiple resource type classes. This implementation is model-agnostic, as it doesn't require any knowledge about the underlying model, be that a resource model, or any other model in question, and uses introspection of the applied model at the time of invocation for the dynamic WSDL generation.

For example, the method uses functionality in application programming interfaces (APIs) of instrumentations of resources, e.g., a Computer Information Model (CIM) or functionality of APIs in case of data representations in case of the presence of configuration databases. The method may provide services that can be used unchanged in a number of different runtime environments (model agnostic). The implementation of a service provided by the method is still conforming to industry standards, for example, adhering to the WS-ResourceFramework specification.

The web service standard WSDM includes, which specifications must be used to implement WSDM interfaces. The Service Group specification describes the enumeration of entries in a collection, while resource property documents (RPD) are XML-documents that describe stateful resources.

Figure 3:
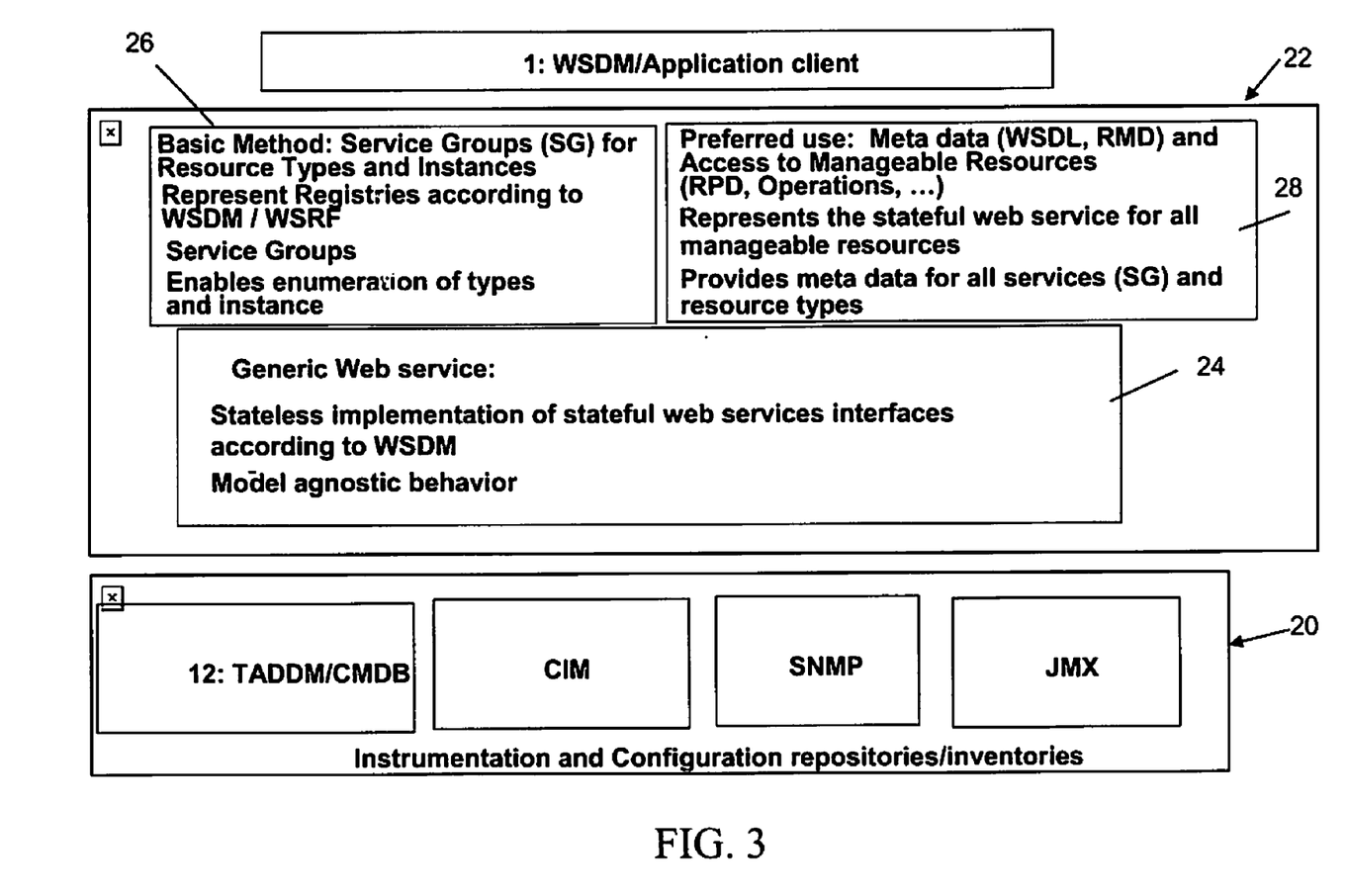
FIG. 3 illustrates the most basic functional components of a preferred embodiment of the method in an overview, summary depiction.

The basic methods of the present invention as sketched in box 26 of FIG. 3 discloses to create Service Group entries and RPDs from data stored in a configuration database such as IBM's configuration database CMDB in a very efficient manner. Further, it enables for an enumeration of resource types.

The method can be applied to other domains such as CIM, SNMP, JMX, etc. In more detail, the before mentioned entries in Service Groups and RPDs are created during request time dynamically. Each time an access to the Service Group, that for example enumerates the classes or types of resources in the CMDB, is requested by a WSDM client, the entries in the Service Group are dynamically created. The same is done for the RPD that actually describes the stateful resource. The RPD is not defined a priori, as it is the case in prior art. Instead, it is preferably generated at request time and passed back to the requestor. It is created from the data stored in the database 12 (CMDB) for a particular class or particular type and is never persisted at any memory or storage used by the method.

So, advantageously, no maintenance work is necessary in order to reflect state information and to track state information other than at the resource registry or configuration database itself.

According to a preferred embodiment, a method for performing systems management on IT-resources using web services is disclosed, wherein the resources are managed in a computational network within a plurality of runtime environments having different respective instrumentations, wherein the web services are implemented according to a public web service standard, e.g., WSDM, wherein a resource configuration database is provided for storing a collection of resource-specific data on said IT-resources, and wherein the method is characterized by the steps of:
  a) using a stateless, generic web service for requesting descriptive information on said IT resources from respective database entries, wherein the descriptive information includes state information associated with a respective one of the resources,
  b) wherein said information includes an enumeration of resource types or classes used within said network, and
  c) using said generic web service for requesting meta data describing different instances currently existing in the network for a given, pre-selected resource type comprised of said enumeration.

From this preferred method, the advantage results that descriptive information on all resource instances is obtained at runtime without the necessity of programming a special web service which is specific for the different instances of a specific resource type. In presence of hundreds or thousands of different resource types and resource type specific instances the steps can be cast into two basic generic web services, which can be used instead of respective hundreds or thousands of web services as required in prior art. This descriptive information can be used for basic tasks of systems management. It can also be used for accessing a resource independently of the plurality of different, prevailing substandards.

In other words, the basic procedure proposed by the present invention includes to collect resource-related data by applying prior art discovery means, to store the data into a suited database, registries, or inventories, and to open these registries and data storages, make the before-mentioned enumerations of types and/or classes of resources, in order to be accessed by a generic web service provided by the invention, which is used in order to support systems management functionality.

By means of this basic procedure, systems management can obtain an overview over all resource types and resource instances which are present in the respective management environment also, in the usual cases, where different instrumentations of the resources are present. This is advantageously achieved by a small number of web services instead of a large number of web services as known from prior art.

The method can be applied for a basically unlimited number of resources including multiple different versioning of resources and including multiple different versioning of communication protocols in use for communicating with the resources or with the resource configuration databases.

Advantageously, changes related to resource types or to relationships between particular resources are automatically included into the method without that any change is necessary to a web service provided by the invention. This is due to the fact that no additional persistent data storage is required for the method, as it is applied just during runtime of the resource. So, any state information is freshly retrieved form a resource configuration database or from a resource itself, respectively and is sent via the web service to a respective administration staff member.

Another preferred embodiment of the invention comprises the stateless implementation of a web services access layer usable when a resource shall be accessed for monitoring purposes: by this access specifically, the capability of sending commands to the resource is of high interest as well as the retrieval of high-frequently changing data for monitoring purposes.

Then the further steps are implemented preferably in two additional web services:
  d) using the before-mentioned generic web service for a request requesting information on resource-specific metadata indicating access rules required for accessing said resource,
  e) receiving said metadata,
  f) performing an access to said resource specifying said received metadata.

The state of the resource is maintained within the instrumentation of the resource. No additional persistence on top is implemented according to the invention. In other words, state information of said resource is generated during runtime of a request to access said resource. The stateful behavior as required by the WSDM and WS-Man standards is fully available for clients despite its stateless implementation. This enables advantageously to scale in large environments and provides high availability as the clients are not bound to a single resource instance.

It should be noted that a key capability of the invention is that the method does not perform a generic abstraction of multiple underlying interfaces to one generic interface. Instead, the provided web services open up a dialogue at runtime, between the client occupied with systems management tasks and the resources, or a resource configuration database, during which dialogue multiple stages are run: in a first stage, a list of resource types is requested. In the second stage properties, operations, relationships, etc of resource instances are requested. In a third, optional stage driven by use cases, in which an actual access to a resource is desired, a Meta data description of a resource instance is requested and delivered to the client. And in a last stage, instance data are requested, which are required to access a particular resource.

The method has a broad range of use case. The major ones are listed below:

It can be used to generate required web services artifacts such as WSDL, RMD, etc.

It can also be used to access the actual resource in order to get information thereof.

It can be used to change properties of the resource, or generally, to send commands to the resource.

It can be used to simulate the stateful behavior requested by WSDM/WS-Man standards using a stateless implementation.

It can be used to generate events, or to create topology graphs, or to navigate relationships between resources.

In summary, the advantages of the method are thus as follows:

A single implementation of a low number of web services, basically only two, reduces implementation and maintenance efforts significantly.

Clients do not need to maintain WSDL libraries.

Service implementers do not need to maintain WSDL libraries. Changes in the underlying models are automatically made available to clients. These changes fall basically in the category of additional or modified attributes/properties/operations, and/or modified or additional resource types. This is a significant feature, because prior art needs to re-deploy the changes including restart of the runtime application server.

A realistic number of resources can be processed including complex ones. The prior art implementations lack the ability to scale in real-life scenarios. This is because of their stateful implementation using elements of implementations of the WS-RF stack. The method just requires the WS-Addressing stack as a software based prerequisite as it simulates the stateful behavior but is in turn stateless.

A WSDL provided by the invention always reflects the real-world at runtime which eliminates runtime errors, while prior art can have inconsistent artifacts due to it is a priori definition.

The method yields less run time resource consumption on the client and on server side due to less web service implementations.

For example, WSDM on top of CIM instrumented resources is different from WSDM wrapping the data representations in the configuration management database, because additional capabilities can be offered to WSDM clients due to the method.

The present invention discloses to create dynamically during request time entries in Service Groups, preferably in the complete Service Group, and in the RPD documents. Each time an access to the Service Group that e.g., enumerates the Classes/Types in the CMDB, is requested by a WSDM client, the entries in the Service Group are dynamically created.

The same is done for the resource property documents (RPD) that actually describes the stateful resource. According to this feature the RPD is not defined a priori; it is rather generated at request time and passed back to the requester.

The RPD is created from the data stored in the CMDB for a particular class/type and is never persisted. Thus, non-persistent entries of Service Groups or other enumeration implementations behave as if it would have entries persisted, but they advantageously need no maintenance for holding the entries up-to-date.

According to a preferred aspect of the invention, when using the query language of the configuration database also in Service Group specifications the query language of the source (CMBD=MQL, CIM=CQL, etc) is in terms of queries transparently mapped to the Service Group specification requirements.

Thus, advantageously, the scalability and performance of the underlying query implementations is supported with minimal overhead.

BRIEF DESCRIPTION OF THE DRAWINGS

The present invention is illustrated by way of example and is not limited by the shape of the figures of the drawings in which.

It is to be noted, however, that the appended drawings illustrate only example embodiments of the invention, and are therefore not considered limiting of its scope, for the invention may admit to other equally effective embodiments.

DETAILED DESCRIPTION

Figure 2:
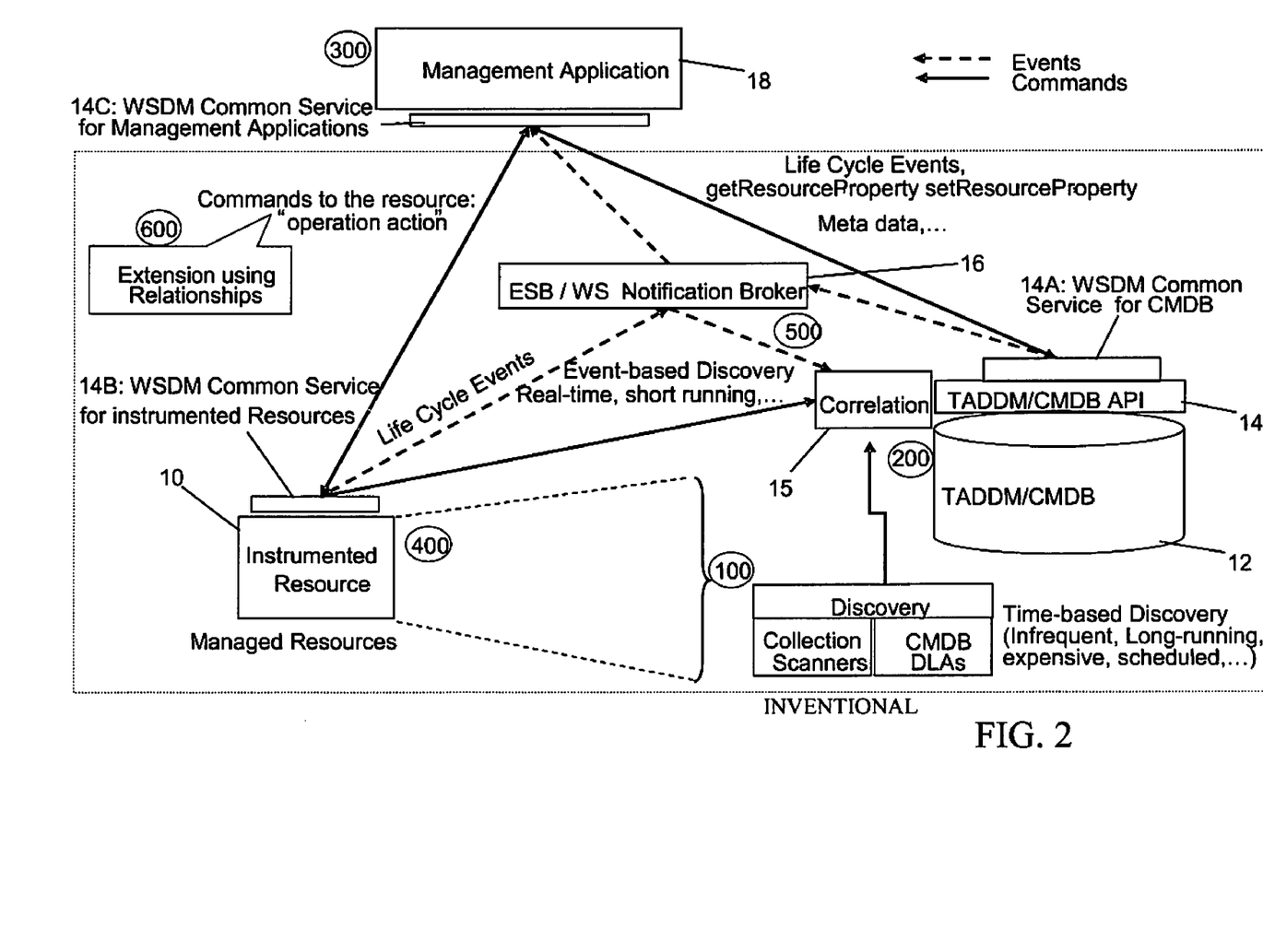
FIG. 2 illustrates the structural and functional components of a hardware and software environment used for a preferred web service based systems management method according to a preferred embodiment of the method.

With general reference to the figures and with special reference now to FIG. 2 the main components of the present invention are WSDM-enabled instrumented resources 10, a configuration database 12 used as a registry that has WSDM interfaces 14, a message infrastructure enabled by a notification broker 16 to support handlings of events, and a systems management application 18 exploiting WSDM.

Reference is made to FIG. 2, and the following interaction steps 100 to 600:

Step 100: Time-based discovery gathers information about network attached IT-resources and stores it in a configuration database 12, for example in a TADDM (Tivoli Application Distributed Discovery Manager (TADDM)/Configuration Management Database (CMDB). Typically, the discovery processes are long-running, scheduled activities that require a lot of compute resources. According to the invention this needs to be done only once for resources with WSDM enablement and WSDM discovery. In prior art this must be done repeatedly.

Step 200: Multiple discovery runs performed by prior art systems management application require a correlation component 15 ensuring that new data is inserted, or already existing data is updated.

Step 300: Systems management applications 1 query Meta data (Web Services Description Language (WSDL), RMD, RPD), enumerate CMDB classes, enumerate instances of a particular class and follow the relationships of the respective entities. They access entries in database 12 as WSDM manageable resources. They can subscribe to events issued by the database 12 to the Notification Broker 16. To do this using WSDM, is enabled by using a small set of generic web services referred to in here as "WSDM common services" (WSDM CS). Prior art offers no generic web services.

Step 400: Resources with applied instrumentation capabilities such as Computer Information Model (CIM), Simple Network Management Protocol (SNMP), or Java Management Extension (JMX) are WSDM-enabled and thus usable for web service based system management by using a set of web services called "WSDM CS" for instrumented Resources. Details how these services work using a generalized proxy pattern, are given further below. These resources emit life cycle events such as "resource created" or "resource destroyed" to the notification broker 16. This provides for the ability for short-running, real-time discovery as well as other capabilities such as providing data to subscribers that are not stored in the configuration database 12. Typically, this would be monitoring dynamic data like CPU load, number and type of active operating system processes, and the like.

Step 500: When it is assumed that such an IT Resource advertises it's presence in the network through a life cycle event, the correlation component 15 needs to check, if the data representation of the resource is already in the database, because it is found earlier by, for example, time-based discovery runs. Thus, the correlation component 15 is required in order to correlate existing entries with newly discovered ones. Further, the correlation task is extended in order to cope with:

a) WSDM enabled resources which have advertised life cycle events, and b) resources discovered with prior art mechanisms.

If an entry is not yet present, an entry is created in the database 12. In both cases a relationship is established in the database that links the data entry with the Instrumented Resource. This enables clients to query the data representation and get access to the associated instrumented resources as well.

Multiple such relationships can be associated to the data entry.

The complexity of the correlation functionality varies with the underlying models of the instrumented resources and the representation in the database 12. The straightforward case is, if both have the same underlying model. In case they differ, policies need to be defined to allow identifying if the data representation in the database 12 is the one representing the instrumented resource.

Step 600: Then it is possible to actually do systems management with the instrumented resource for example, by issuing a command to the resource.

With reference to FIG. 3 an overview diagram is given illustrating the basic system.

Included in a bottom layer 20, typical elements used in prior art of systems management are shown. Inventories, also known as registries are realized by systems management products itself e.g., IBM Director, TPM, or they use configuration databases such as TADDM/CMDB and instrumentation technologies such as CIM, SNMP, JMX. These instrumentation sources or repositories keep all information of IT-resources like configuration parameters and state.

In the middle layer 22, the method is roughly illustrated in an overview form.

Block 24 depicts general functionality thereof: the usage of a core pattern that is used to implement generic web services as described further above. The web services according to the invention use the stateless implementation of stateful interfaces of web services according to WS standards as well as an inherent model agnostic behavior.

In order to access an IT-resource, two additional web services depicted in box 28 are provided according to the invention:

One additional web service is used to retrieve meta-data from the available services and the available resource types. In the case of using web service standards for management this meta-data is the WSDL and the RMD.

The second additional web service is a web service implementation which in turn plays the role of each web service which is "virtualizing" the resource using web services. In WSDM terminology this is the WSDM manageable resource.

Figure 4:
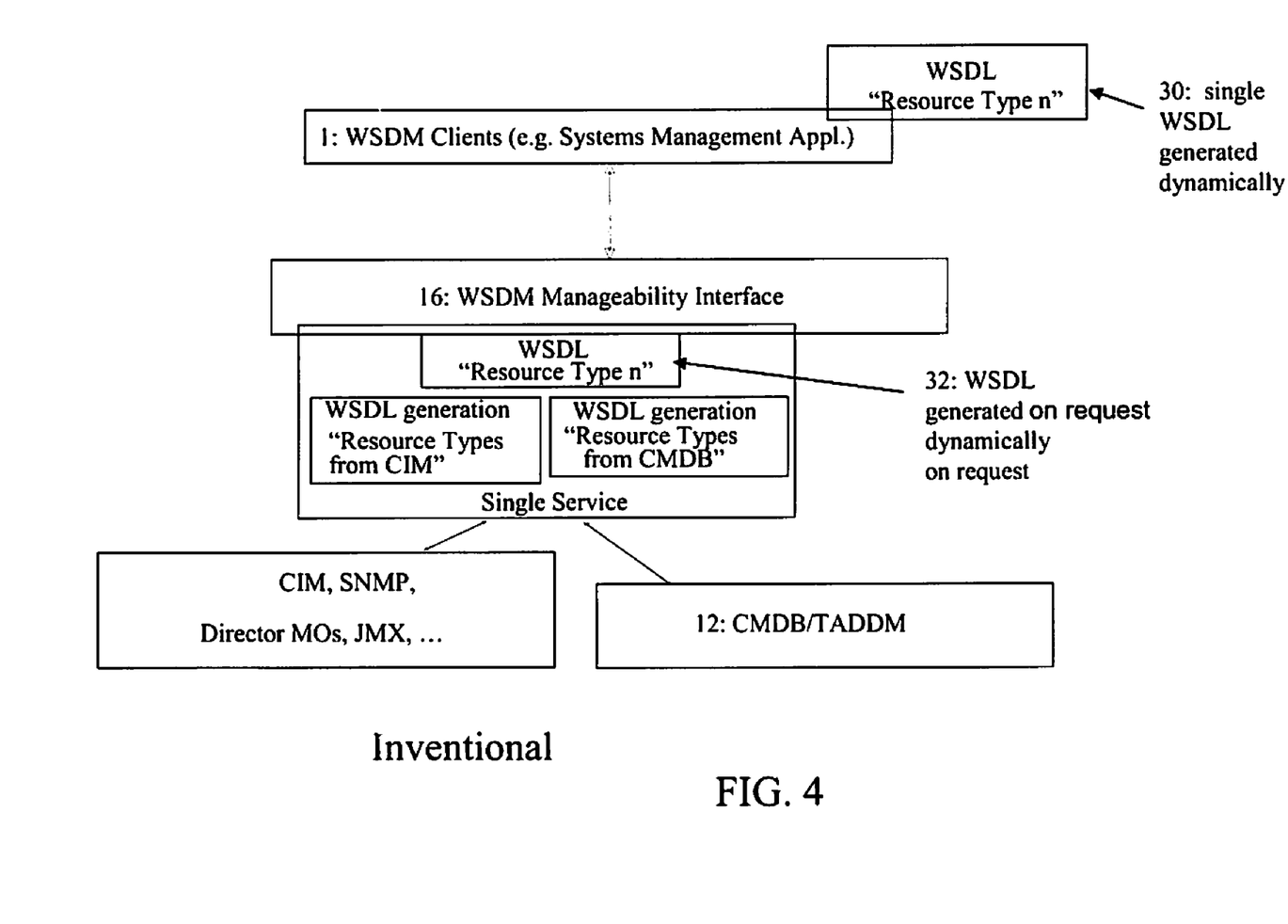
FIG. 4 illustrates the most basic structural components of an hardware and software environment used for a preferred embodiment of the method in a view opposed to that of FIG. 1.

FIG. 4 is an overview diagram illustrating the architecture as opposed to FIG. 1. A single generic web service creates a single WSDL 30. Separate functional control software generates the WSDL for all resource types from CIM, whereas another separate unit generates the WSDLs for resources, the types of which are stored in the configuration database 12 referred to in here as CMDB.

As opposed to the prior art it is clear to a person skilled in the art that from a client perspective a significant simplification is achieved over prior art by the method, as only one WSDL is required to deal with all resource types. Remark, that in prior art this was a number about 1000.

On the web service implementation side the architecture is simplified also. A single service 32 provides responses to client requests with dynamically generated payload.

Figure 5:
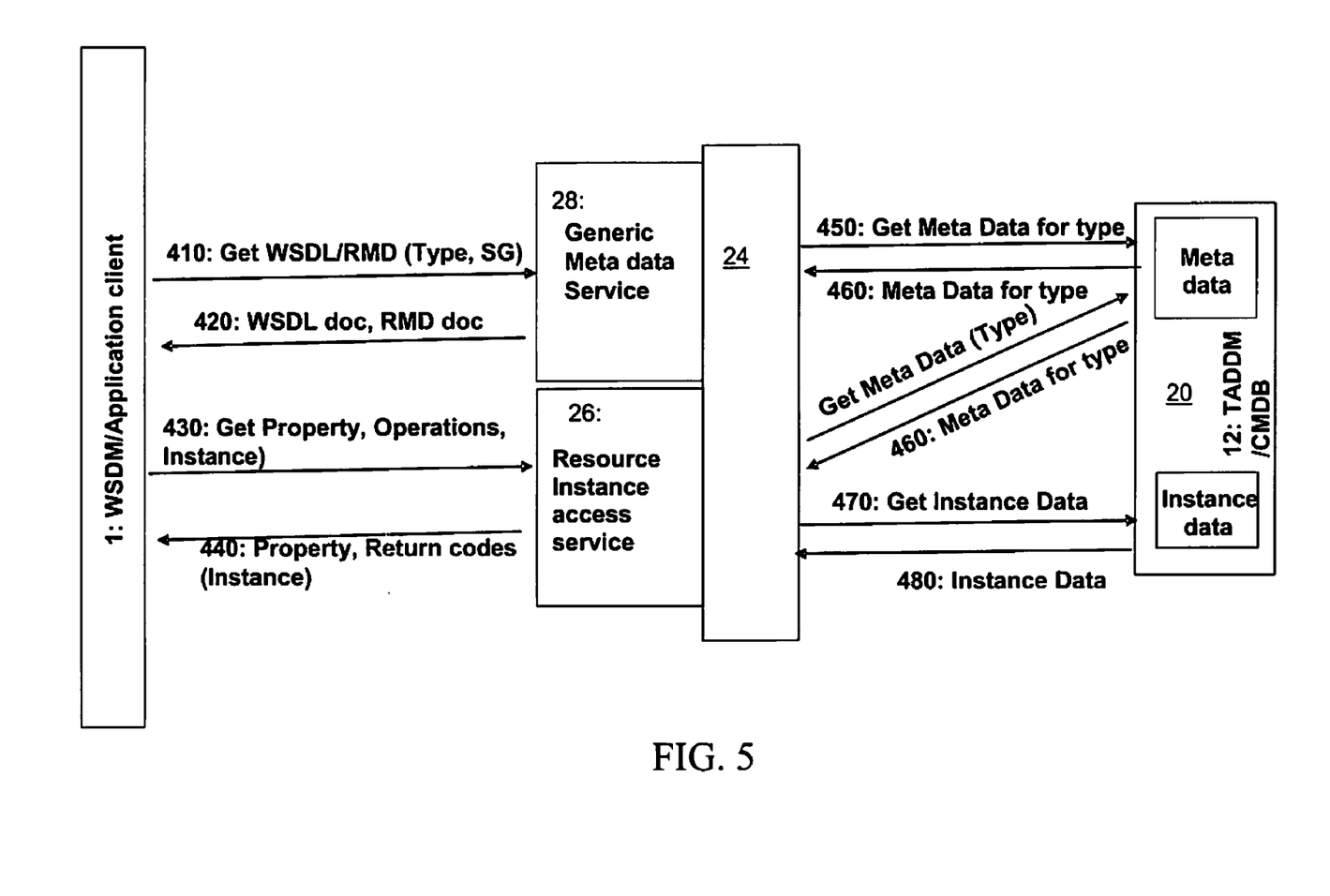
FIG. 5 illustrates an interaction diagram illustrating interaction of the most important steps of a preferred embodiment of the method between the cooperating components.

With reference to FIG. 5 more details are given outlining how a WSDM client is provided with meta-data for a particular resource type using the inventional, generic implementation of a meta-data service. The boxes correspond to that of FIG. 3. In this case the meta-data service plays the role of a meta-data service for that particular type and retrieves the appropriate information from the configuration database 12. According the WSDM standard specification, the WSDL and the RMD are returned to the WSDM client 10.

Remark that in prior art a resource property is requested on a resource ID. Then the type of the resource is looked up locally, to pick the correct WSDL interface definition. Then, a web service is called to request the respective resource property document. According to the invention the resource property is requested on a resource ID. Then the generic web service is called with the resource ID to get a dynamically generated WSDL. Then a web service is called to request the resource property document.

Properties and operations of WSDM Manageable Resources are then accessed or executed using the retrieved meta-data and the second web service 26 labeled "Resource Instance Access Service".

In more detail, according to this embodiment a first request is sent 410 from client 1 to the meta data service 28.

This is a request requesting for the WSDL or the RMD of a certain resource type or Service Group. This request is serviced by the metadata service 28 producing a response 420 comprising an automatically generated WSDL document or/and an automatically generated resource metadata document (RMD).

The component 24 provides the generic capabilities described above with reference to FIG. 3 to the services 28 and 26.

Then, in a next request 430 client 10 requests the properties or operations and other system attributes for a certain instance of one type of resources specified in request answer 420. Then, the resource instance access service 26 fulfills the request using the component 24 and gets the meta data 460 of the requested type by querying the configuration database 12 of layer 20. With the enriched request information a new request 470 is issued to the configuration database 12 of layer 20 and the Instance data is returned 480.

The response 440 to the client 1 is fulfilled with the help of the responses 460 and 480.

In a concrete use case according to FIG. 5, the client application 1 may be assumed to access a property of a specific Operating System (OS), namely the Vendor Name thereof. It queries two registries with WSDM compliant requests (QueryResourceProperty), step 430, to finally get the EndPointReference (ERP) of the Operating System instance, step 480, which is then accessed using the WS common service with a WSDM compliant GetResourceProperty request.

Figure 8:
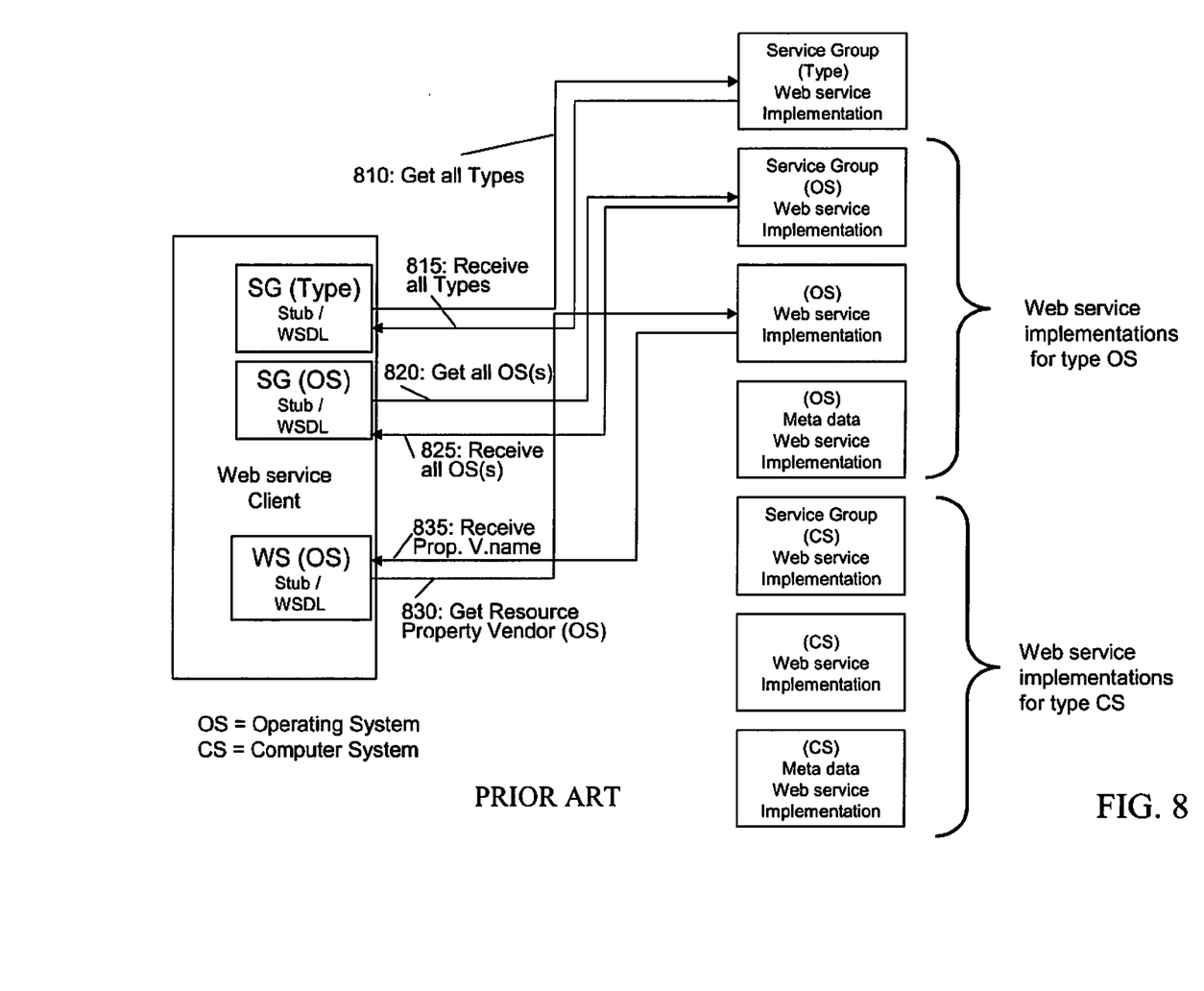
FIG. 8 is a prior art depiction of a control flow/interaction diagram illustrating the request response scheme according to prior art.
Figure 9:
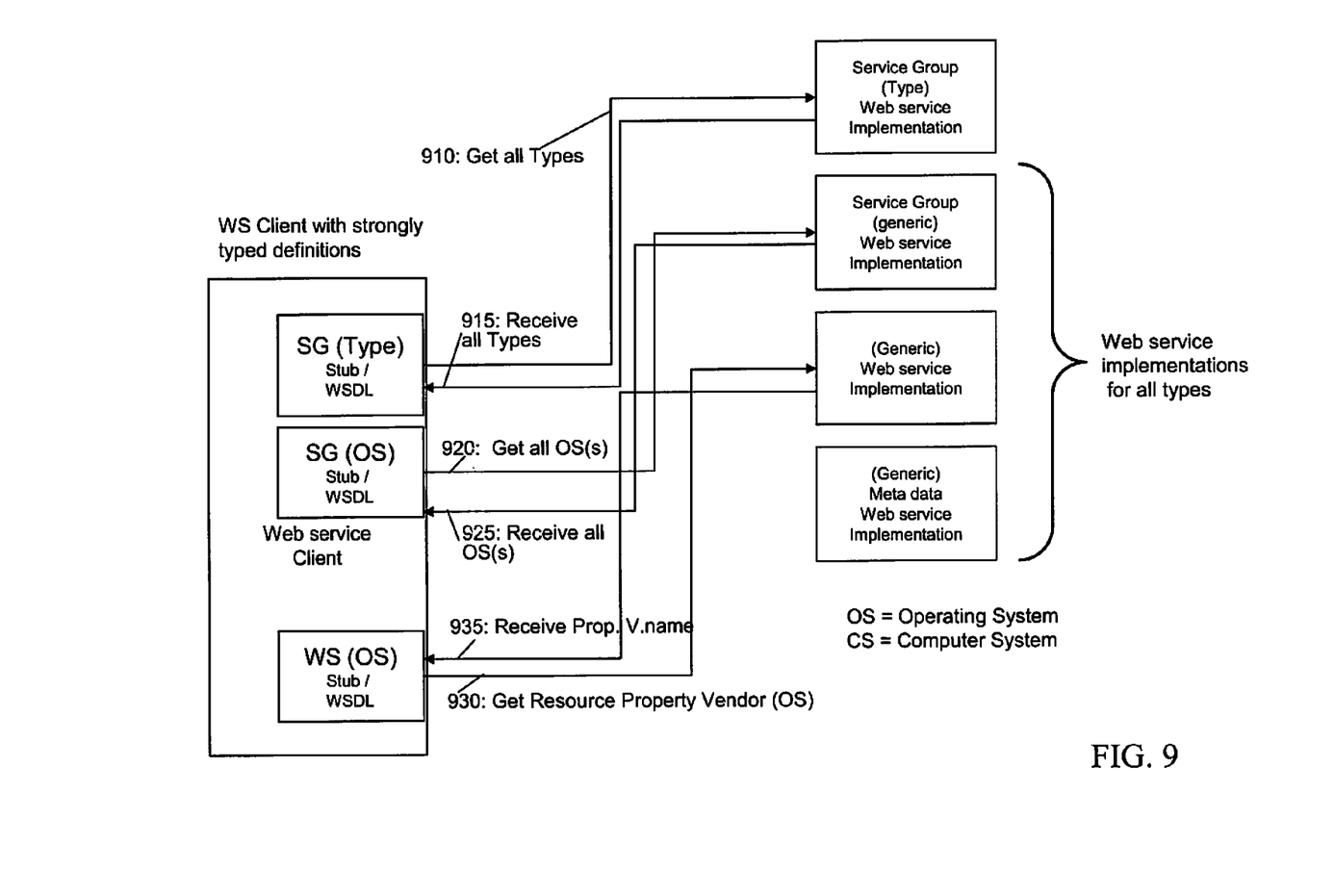
FIG. 9 illustrates the control flow and interaction diagram according to an embodiment, in which the systems management client uses a prior art typed management of resources and the server side (right column) is provided with a generic web service implementations.
Figure 10:
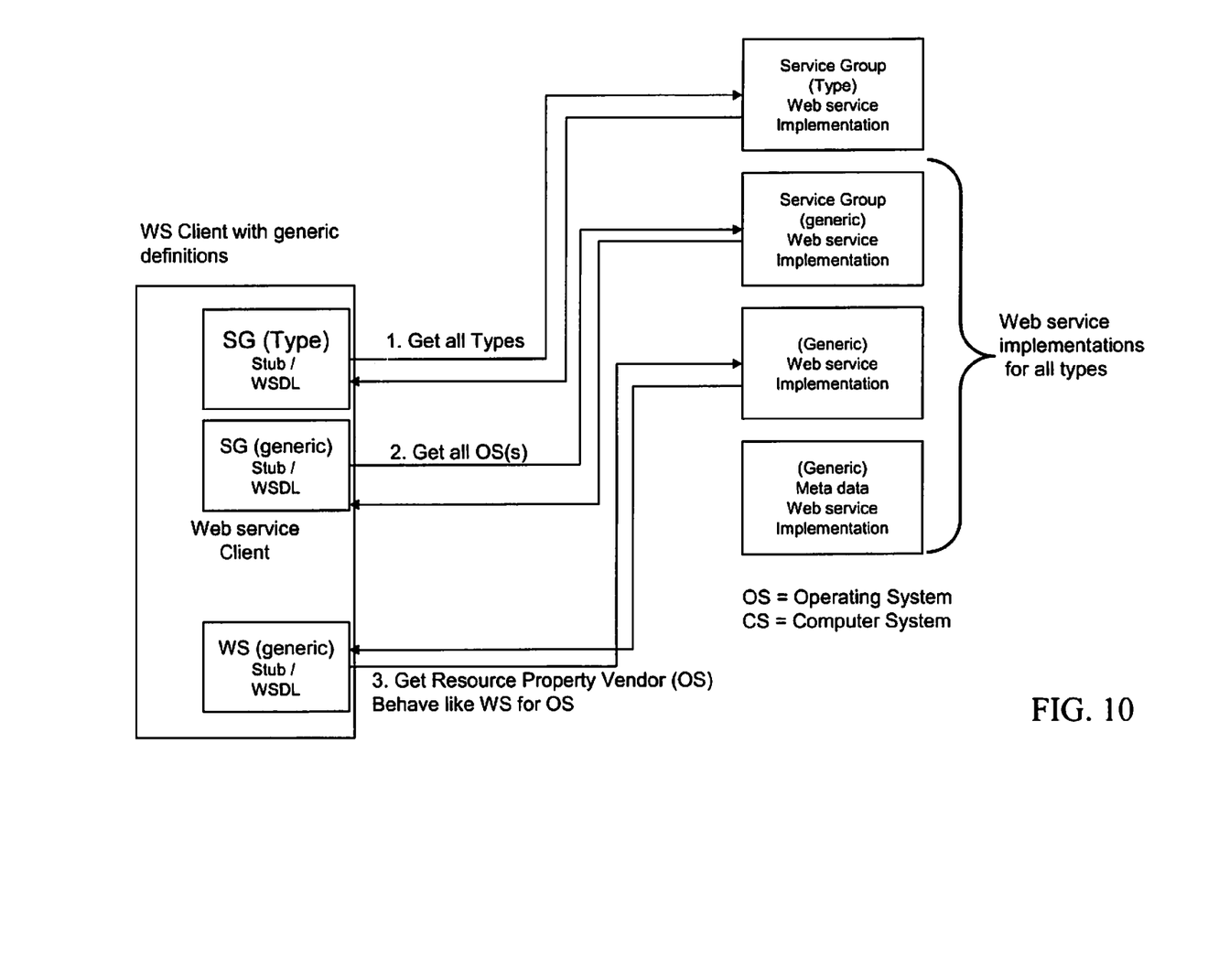
FIG. 10 is a depiction according to FIG. 9, but also implementing generic definitions for the systems management client.

This example is detailed in the FIGS. 8, 9 and 10 where the prior art access pattern is shown in FIG. 8 for the purpose of improved clarity, ready to be compared with preferred embodiments of the method depicted in FIGS. 9 and 10:

FIG. 8 is a prior art depiction of a control flow/interaction diagram illustrating the request response scheme according to prior art, In FIG. 8 prior art queries the Service Group to get all resource types, see step 810. After having received them, step 815, the client requests all Operating System (OS) instances from the Service Group implementation for Operating Systems, see step 820. After having received them, step 825, with one of the OS instances the OS service is accessed, see step 830 to retrieve the property "vendor name", see step 835. Remark, that disadvantageously, for all types that the prior art system supports it needs respective web service implementations, see all boxes in the upper part of the right column. In FIG. 8, the resource type "Computer System" (CS) is shown as a second type, see bottom part of right box column.

FIG. 9 illustrates the control flow and interaction diagram according to an embodiment, in which the systems management client uses a prior art typed management of resources and the server side (right column) is provided with a generic web service implementations, and FIG. 9 shows the same access pattern using a preferred embodiment of the invention, see steps 910 to 935, which correspond to steps 810, 835. The type specific web service implementations, see the right column of boxes, are replaced according to the invention by the generic implementations of the invention. The generic implementations behave like the type with which the client is requesting the service. Note, that FIG. 9 shows a client using strongly typed web service definitions. This is an option that can be used by client applications that e.g., want to deal with an entitled set of types.

FIG. 10 is a depiction according to FIG. 9, but also implementing generic definitions for the systems management client. In a variant of FIG. 9 a generic client can access all types supported by the generic service implementations.

Next, and with reference back to FIG. 6, some details of a preferred implementation of the preferred embodiment are given in relation to WSDM CS and instrumented Resources.

The prior art WSDM Common Services (CS) components can be advantageously used for inventories and/or registries that maintain copies of data of "real" IT resources as well as for IT resources with instrumentations such as the before-mentioned CIM, SNMP, or JMX.

In order to use the WSDM CS components in a systems management environment using web services this is very important, because registries/inventories only store data of IT resources that are either immutable (e.g., the MAC address), or very infrequently changed after they have been discovered (e.g., the hostname, the IP Address, or the Vendor Name). It should be noted that in prior art systems management frequently changing data for purposes of monitoring, such as CPU load, or even operations/commands are not available from inventories or registries.

Figure 6:
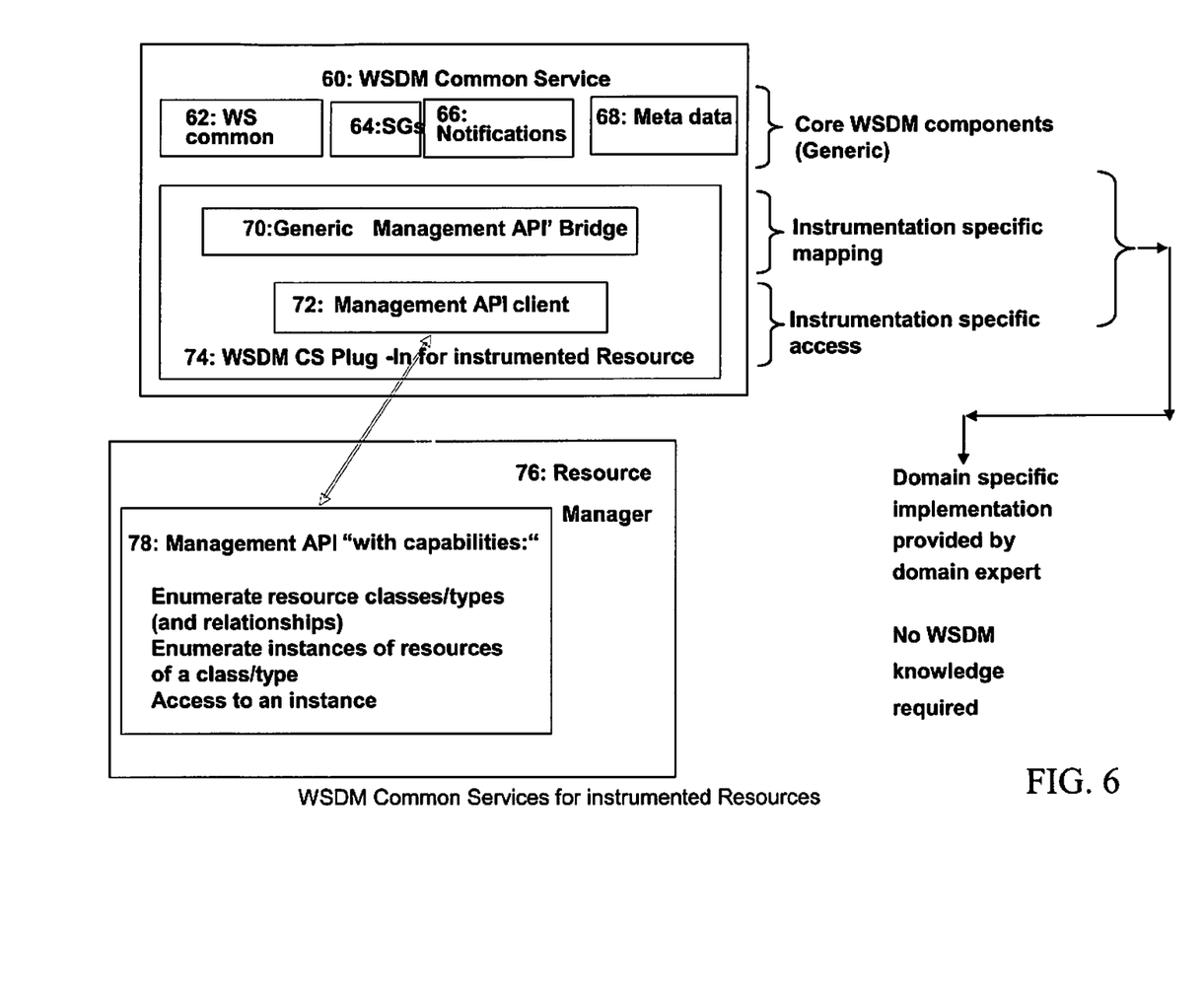
FIG. 6 illustrates the most basic functional components of a preferred embodiment of the method implementing WSDM Common Services.
Figure 7:
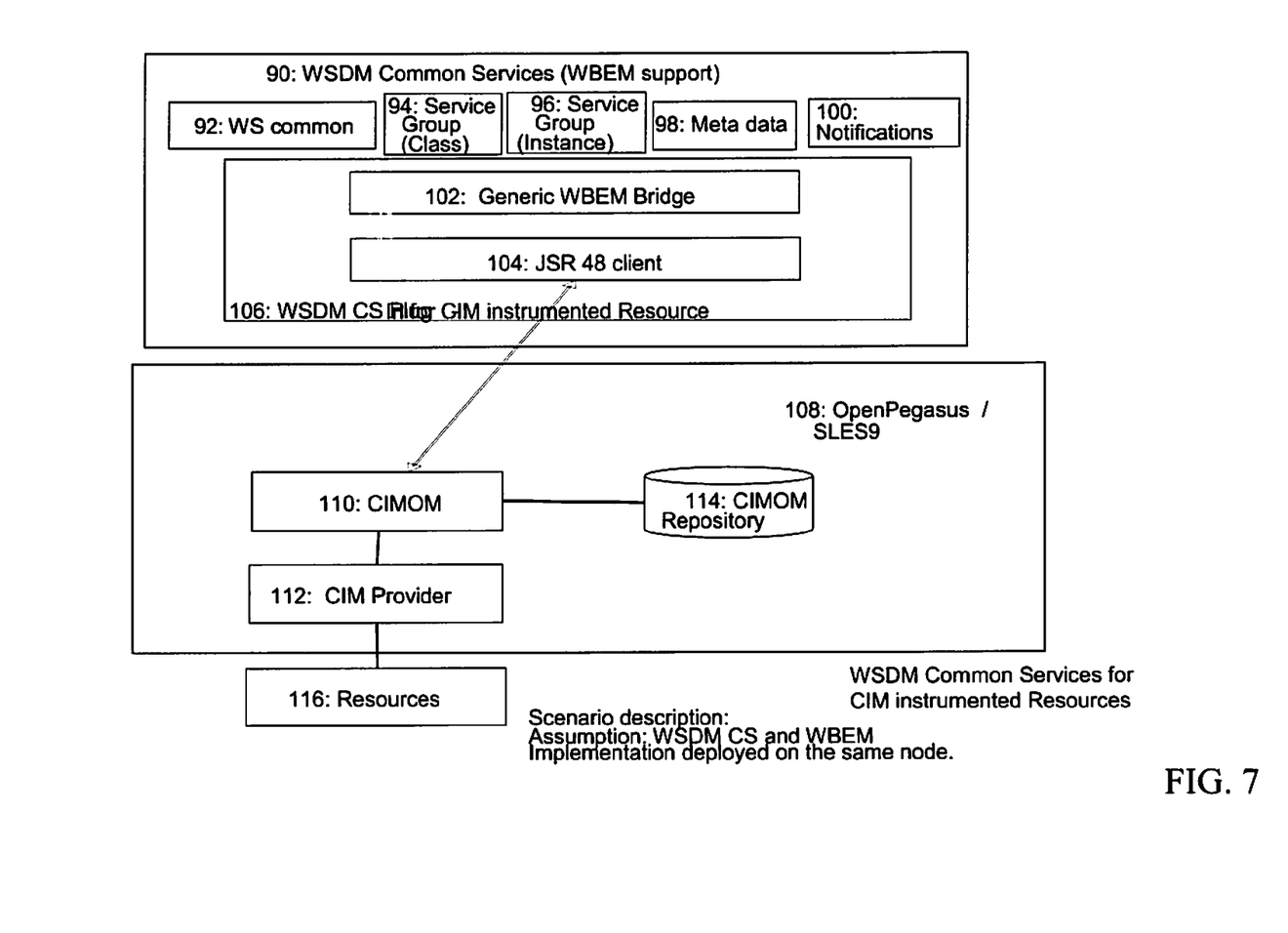
FIG. 7 illustrates the most basic functional components of a preferred embodiment of the method implementing WSDM Common Services for CIM instrumented resources.

In FIGS. 6 and 7 details are illustrated disclosing how WSDM CS is applied to instrumented resources in general; a specific implementation is selected for CIM:

FIG. 6 shows the components of the small set 60 of generic web services referred to in here as "WSDM common services" (WSDM CS). Its layers are separated in core web services components, instrumentation specific mapping and instrumentation specific access. All instrumentation specific components are implemented using a respective plug-in 74. It is made up of a client 72 to the management API of the resource manager 76, e.g., a WBEM client and a bridge that maps requests from the web services components 62, 64, 66, and 68 to the instrumentation specific management API. The "WS common" component 62 is the generic service that handles all access to the resource. Component 64 is made up of two services that are a Service Group for enumeration of types and an enumeration of instances for a specific type. Notifications about Life Cycle Events (created, destroyed, updates, . . . ) are provided, or emitted using component 66. The meta data service 68 provides meta data artefacts such as WSDLs and RMDs.

FIG. 6 further depicts the Resource Manager 76 (e.g., CIMOM, or TADDM) containing respective programmed capabilities to:
 Enumerate resource classes or types and relationships,
 Enumerate instances of resources of a class/type,
 Allow access to an instance.

Usually these capabilities are provided by an application programming interface (API) or by a command line interface.

In FIG. 7 an example for a concrete implementation of the scheme in FIG. 6 is given. The web services components 92, 94, 96, 98, 100 are never changed. For the WBEM/CIM support 90 the plug-in 106 is implemented using the generic bridge 102 and the appropriate JSR 48 client. The later communicates with the CIMOM 110 of the OpenPegasus implementation available with the Linux operating system SLES9, see reference 108. The component 114 provides the persistence capability of CIM where a CIM Provider 112 deals with the actual resources 116.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for performing systems management on IT-resources using web services, wherein said resources are managed in a computational network within a plurality of runtime environments having different respective instrumentations, wherein a resource configuration database is provided for storing a collection of resource-specific data on said IT-resources, comprising by the steps of:
 at runtime of a systems management operation directed to a predetermined IT-resource, using a stateless, first generic web service for requesting, in a first request on behalf of a systems management application client, descriptive information concerning said IT resource from respective entries of said configuration database, wherein said descriptive information includes an enumeration of a plurality of different resource types used within said computational network, said predetermined resource belonging to at least one of said plurality of different resource types, said first generic web service for requesting descriptive information concerning any of said plurality of different resource types;
 selecting a specific one of said resource types corresponding to said predetermined IT-resource from a response of said first generic web service;
 using a second generic web service for requesting, in a second request on behalf of said systems management application client, meta data describing a plurality of different resource instances currently existing in the network for said selected resource type, said second generic web service for requesting meta data describing any of said plurality of different resource instances existing in the network for said selected resource type;

selecting a specific one of said plurality of different resource instances from a response of said second generic web service, the selected resource instance corresponding to said predetermined IT-resource;

using said second generic web service for requesting, in a third request on behalf of said systems management application client, meta data describing at least one of: (a) one or more properties of said selected resource instance, and (b) one or more operations currently validly operable at said selected resource instance; and using said meta data describing at least one of: (a) one or more properties of said selected resource instance, and (b) one or more operations currently validly operable at said selected resource instance received responsive to said third request to perform at least one of a systems management operation on said selected resource instance and an access to said selected resource instance, wherein said at least one of a systems management operation on said selected resource instance and an access to said selected resource instance are performed by said system management application client without using said first or second generic web service.

2. The method according to claim 1 further comprising the steps of:

using said first generic web service for a request requesting information on resource-specific metadata indicating access information required for accessing said resource, receiving said metadata, performing an access to said resource specifying said received metadata.

3. The method according to claim 1, wherein state information of said resource is maintained within an instrumentation of said resource, and state information of said resource is generated during runtime of a request to access said resource.

4. The method according to claim 1, further comprising the step of:

during a time of at least one of said first, second, and third request, dynamically creating entries in Service Groups (SG).

5. The method according to claim 4, further comprising the step of:

using the query language of said configuration database also in a Service Group specification.

6. The method according to claim 1, further comprising the step of:

during a time of at least one of said first, second, and third request, dynamically creating entries in a Resource Property Documents (RPD) from meta data stored for a respective resource in said configuration database.

7. A data processing system usable for performing systems management on IT-resources using web services, wherein said resources are managed in a computational network within a plurality of runtime environments having different respective instrumentations, wherein a resource configuration database is provided for storing a collection of resource-specific data on said IT-resources, comprising:

at least one processor; and a plurality of web services embodied as instructions recorded in non-transitory computer usable media and executable on said at least one processor, said plurality of web services performing a method comprising the steps of:

at runtime of a systems management operation directed to a predetermined IT-resource, using a stateless, first generic web service for requesting, in a first request on behalf of a systems management application client, descriptive information concerning said IT resource from respective entries of said configuration database, wherein said descriptive information includes an enumeration of a plurality of different resource types used within said computational network, said predetermined resource belonging to a least one of said plurality of different resource types, said first generic web service for requesting descriptive information concerning any of said plurality of different resource types, wherein a specific one of said resource types corresponding to said predetermined IT-resource is selected from a response of said first generic web service;

using a second generic web service for requesting, in a second request on behalf of said systems management application client, meta data describing a plurality of different resource instances currently existing in the network for said selected resource type, said second generic web service for requesting meta data describing any of said plurality of different resource instances existing in the network for said selected resource type, wherein a specific one of said plurality of different resource instances is selected from a response of said second generic web service, the selected resource instance corresponding to said predetermined IT-resource; and using said second generic web service for requesting, in a third request on behalf of said systems management application client, meta data describing at least one of: (a) one or more properties of said selected resource instance, and (b) one or more operations currently validly operable at said selected resource instance, wherein said meta data describing at least one of: (a) one or more properties of said selected resource instance, and (b) one or more operations currently validly operable at said selected resource instance received responsive to said third request, is used for performing at least one of a systems management operation on said selected resource instance and an access to said selected resource instance, wherein said at least one of a systems management operation on said selected resource instance and an access to said selected resource instance are performed by said system management application client without using said first or second generic web service.

8. The data processing system according to claim 7 wherein the method further comprises the steps of:

using said first generic web service for a request requesting information on resource-specific metadata indicating access information required for accessing said resource, receiving said metadata, wherein said metadata is for performing an access to said resource specifying said received metadata.

9. The data processing system according to claim 7, wherein state information of said resource is maintained within an instrumentation of said resource, and state information of said resource is generated during runtime of a request to access said resource.

10. The data processing system according to claim 7, wherein the method further comprises the step of:

during a time of at least one of said first, second, and third request, dynamically creating entries in Service Groups (SG).

11. The data processing system according to claim 10, wherein the method further comprises the step of:

using the query language of said configuration database also in a Service Group specification.

12. The data processing system according to claim 7, wherein the method further comprises the step of:

during a time of at least one of said first, second, and third request, dynamically creating entries in a Resource Property Documents (RPD) from meta data stored for a respective resource in said configuration database.

13. A computer program product usable for performing systems management on IT-resources using web services, wherein said resources are managed in a computational network within a plurality of runtime environments having different respective instrumentations, wherein a resource configuration database is provided for storing a collection of resource-specific data on said IT-resources, comprising a non-transitory computer useable medium including a computer readable program, wherein the computer readable program includes a functional component that when executed on a computer causes the computer to perform the steps of:

at runtime of a systems management operation directed to a predetermined IT-resource, using a stateless, first generic web service for requesting, in a first request on behalf of a systems management application client, descriptive information concerning said IT resource from respective entries of said configuration database, wherein said descriptive information includes an enumeration of a plurality of different resource types used within said computational network, said predetermined resource belonging to a least one of said plurality of different resource types, said first generic web service for requesting descriptive information concerning any of said plurality of different resource types, wherein a specific one of said resource types corresponding to said predetermined IT-resource is selected from a response of said first generic web service;

using a second generic web service for requesting, in a second request on behalf of said systems management application client, meta data describing a plurality of different resource instances currently existing in the network for said selected resource type, said second generic web service for requesting meta data describing any of said plurality of different resource instances existing in the network for said selected resource type, wherein a specific one of said plurality of different resource instances is selected from a response of said second generic web service, the selected resource instance corresponding to said predetermined IT-resource; and using said second generic web service for requesting, in a third request on behalf of said systems management application client, meta data describing at least one of: (a) one or more properties of said selected resource instance, and (b) one or more operations currently validly operable at said selected resource instance, wherein said meta data describing at least one of: (a) one or more properties of said selected resource instance, and (b) one or more operations currently validly operable at said selected resource instance received responsive to said third request, is used for performing at least one of a systems management operation on said selected resource instance and an access to said selected resource instance, wherein said at least one of a systems management operation on said selected resource instance and an access to said selected resource instance are performed by said system management application client without using said first or second generic web service.

* * * * *